Nov. 9, 1926.
G. W. CRIST
UNIVERSAL JOINT
Filed May 1, 1925
1,606,514
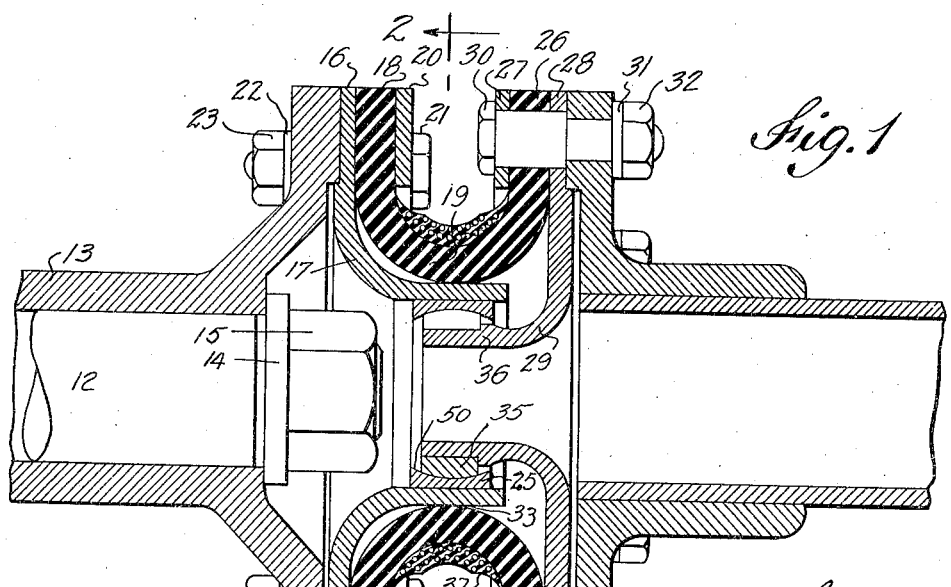
Fig.1
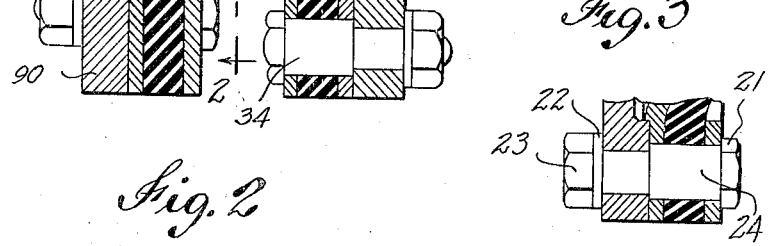
Fig.3
Fig.2
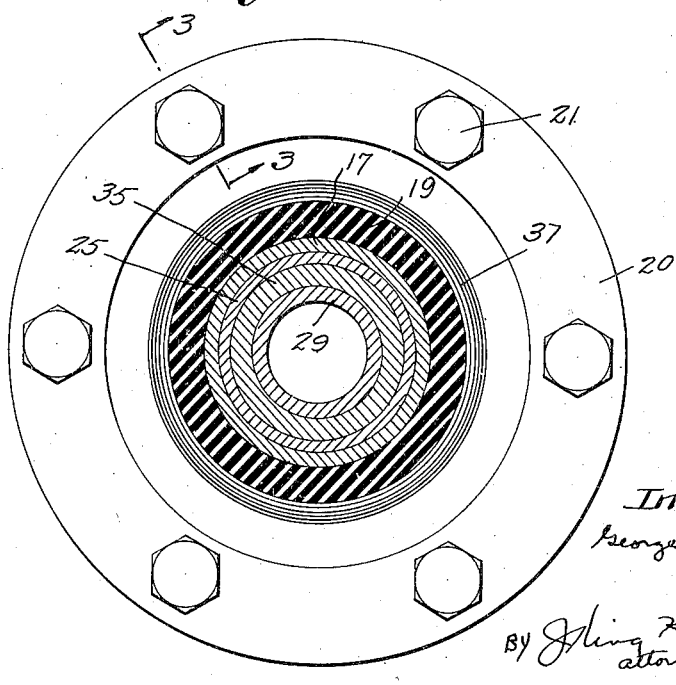
Inventor:
George W. Crist
By King Harness
attorney Patented Nov. 9, 1926.

1,606,514

UNITED STATES PATENT OFFICE.

GEORGE W. CRIST, OF DETROIT, MICHIGAN.

UNIVERSAL JOINT.

Application filed May 1, 1925. Serial No. 27,305.

The primary object of my invention is to produce a universal joint that is of simple structure and one that can be very cheaply manufactured.

A further object of my invention is to provide a flexible joint for transmitting power between rotating shafts that will withstand hard knocks and jars without causing displacement of parts or breaking down under heavy strains.

It is another object of my invention to provide a universal joint that will operate the connected shafts at a number of limited angles without completely disconnecting the shafts as is customary in present-day universal joint practice.

A further object of my invention is to provide in my improved device a flexible material that is partially reinforced by a wire section that prevents collapsing of the material under ordinary circumstances and aids in bringing back the joint to its original state when the same has been distorted.

With the above and other objects in view, my invention consists in the arrangement, combination and construction of the various parts of my improved device as described in the specification, claimed in my claims and shown in the accompanying drawings, in which:

Fig. 1 is a central sectional view of my improved device.

Fig. 2 is a sectional view taken on line 2—2 of Fig. 1.

Fig. 3 is a sectional view taken on line 3—3 of Fig. 2.

I have shown the driving shaft 10 having a flanged collar 11 secured thereto and the shaft 12 secured in the shell 13 having a flanged end 90 integral therewith by means of the washer 14 and the nut 15.

A disk 16 having the flanged portion 17, one end 18 of a rubber fabric coupling member 19, which is placed adjacent to the disk 16, and the ring 20 that fits around the edge of the member 19 are secured to the flange 90 by means of the bolts 21, washers 22 and the nuts 23. Cylindrical washers 24 are placed on the bolts 21 to keep the disk 16, the member 19 and the ring 20 evenly spaced from the flange 90.

A ring 25 having a concave spherical inner surface 50 is placed in the inside of the flanged portion 17.

The other end 26 of the coupling member 19, a corresponding ring 27 and the disk 28 that has the flanged portion 29, are secured to the flanged collar 11 by the bolts 30, washers 31 and the nuts 32, so that a part of the member 19 will rest on the flanged portion 17, as at 33. Cylindrical washers 34 corresponding to washers 24 are placed on the bolts 30 to evenly space the disk 28, the end 26 of the member 19 and the ring 27 from the flanged collar 11.

Placed on the exterior side of the flanged portion 29 that partially extends into the ring 25 of the flanged portion 17, is a ring 35 having the convex spherical surface that is adapted to fit within and bear against the concave spherical facing of the ring 25. One end of the ring abuts a shoulder 36 on the flange 29.

It will be noted that the radius of the ring 35 is somewhat smaller than the ring 25, thus allowing partial rotation of the convex surface on the concave surface.

Wires 37 are placed in the hollow of the exterior surface of the coupling member 19 so as to limit the elasticity of the same, prevent collapsing thereof and also to aid in bringing the entire device to its original position so that the member 19 will bear against the flanged portion 17 as at 33.

In the practical operation of my improved device, the shafts 10 and 12 will be simultaneously rotated by means of the flanged collar 11, the flexible coupling member 19 and the housing 13, while the convex surface of the ring 35, which is secured to the flanged portion 29, snugly fits against the concave surface of the ring 25 that is secured on the inner side of the flanged portion 17, so that the convex surface can be partially rotated on the concave surface, thus acting as a guide for the connections between the shafts when they are placed at different angles from each other. A slight endwise movement of the shafts relative to each other is permitted by the ring 25 slipping in the flange 17.

It is obvious that various changes may be made in the arrangement, combination and construction of the various parts of my improved device without departing from the spirit of my invention and it is my intention to cover by my claims such changes as may be reasonably included within the scope thereof.

What I claim is:

1. In combination, a pair of shafts, centering means for said shafts, a flexible coupling secured to said shafts outside said centering means restricting the movement of said means, said flexible coupling comprising a ring of material bent circumferentially to present a U shaped cross section and a plurality of strands of reinforcing material wound around the valley formed by said flexible coupling.

2. A construction as set forth in claim 1 wherein a plurality of strands of wire are disposed around the valley formed by bending said material.

3. In a device of the class described comprising a shaft, a flanged collar secured to said shaft, a shell having a flanged end integral therewith, a second shaft secured in and to said shell, a flexible coupling member, means securing said member to said flanged collar and shell, a flanged disc secured to said flanged end, another flanged disk secured to said flanged collar so that a portion thereof will project in the opening of the flanged portion of said first disk, and means placed around said flanged portions of the disks forming a spherical guideway connection for said shafts when they are not aligned with each other.

4. In a device of the class described comprising a shaft, a flanged collar secured to said shaft, a shell having a flanged end integral therewith, a second shaft secured in and to said shell, a flexible coupling member, means securing said member to said flanged collar and flanged end, a flanged disk having a ring with a concave surface placed on the inside of the flanged portion thereof secured to said flanged end, another flanged disk secured to said flanged collar so that a portion thereof will project into the aperture formed by the flanged portion of said first disk, a ring having a convex surface secured to the exterior of said flanged portion of said second disk so that the convex surface can be partially rotated on the concave surface of said first ring, thereby forming a guideway connection for said shafts when they are not aligned with each other.

5. In a device of the class described comprising a shaft, a flanged collar secured to said shaft, a shell having a flanged end integral therewith, a second shaft secured in and to said shell, a flexible coupling member having a centrally located wire section to aid in lending restricted flexibility to the entire device, as well as the said member, and means securing said member to said flanged collar and flanged end.

6. In a device of the class described comprising a shaft, a flanged collar secured to said shaft, a shell having a flanged end integral therewith, a second shaft secured in and to said shell, a flexible coupling member having a centrally located wire section to aid in keeping the entire device, as well as the said member, rigid and means securing said member to said flanged collar and shell, a flanged disk secured to said flanged end, another disk secured to said flanged collar so that a portion thereof will project into the aperture formed by the flanged portion of said first disk and means placed in and around said flanged portions forming a spherical guideway connection for said shafts when they are not aligned with each other.

7. In combination, a pair of shafts, one of which has a hollow extension, a ring slidable in said extension and having a concave inner face, the other of said shafts having a ring with a convex outer surface secured thereto, and fitted into said first ring, and a flexible coupling for said shafts outside said rings restricting endwise movement of the rings, said flexible coupling comprising a ring of material bent circumferentially to present a U shaped cross section having its respective edges secured to said shafts, and a plurality of strands or reinforcing material wound around the valley formed by the bending of said flexible coupling.

GEORGE W. CRIST.